(12) United States Patent
Moore (10) Patent No.: US 11,565,947 B2
(45) Date of Patent: Jan. 31, 2023

(54) PROCESS TO SAFEGUARD AGAINST WATERBORNE BACTERIAL PATHOGENS

(71) Applicant: Randall Moore, Powell, TN (US)

(72) Inventor: Randall Moore, Powell, TN (US)

( * ) Notice: Subject to any disclaimer, the term of this patent is extended or adjusted under 35 U.S.C. 154(b) by 374 days.

(21) Appl. No.: 16/373,857

(22) Filed: Apr. 3, 2019

(65) Prior Publication Data

US 2020/0317536 A1  Oct. 8, 2020

(51) Int. Cl.

| C02F 1/28 | (2006.01) |
|---|---|
| C02F 1/32 | (2006.01) |
| C02F 1/46 | (2006.01) |
| C02F 1/00 | (2006.01) |
| C02F 103/02 | (2006.01) |

(52) U.S. Cl.
CPC .............. *C02F 1/281* (2013.01); *C02F 1/008* (2013.01); *C02F 1/32* (2013.01); *C02F 1/4602* (2013.01); *C02F 1/4608* (2013.01); *C02F 2103/023* (2013.01); *C02F 2209/36* (2013.01); *C02F 2303/04* (2013.01); *C02F 2303/20* (2013.01)

(58) Field of Classification Search
None
See application file for complete search history.

(56) References Cited

U.S. PATENT DOCUMENTS

| 2005/0139530 A1* | 6/2005 | Heiss ........................ C02F 9/00 210/85 |
| 2006/0081617 A1* | 4/2006 | Lathus ...................... A61L 2/02 219/628 |
| 2014/0026971 A1* | 1/2014 | Roach ..................... C02F 1/008 137/3 |
| 2018/0334395 A1* | 11/2018 | Code ..................... C02F 1/4674 |

* cited by examiner

*Primary Examiner* — Richard C Gurtowski
(74) *Attorney, Agent, or Firm* — Mark A. Litman & Associates, P.A.

(57) ABSTRACT

A method for mitigating microbe buildup within a potable water supply system including:
cleaning of the water supply system; acquiring data including at least water conditions at multiple points within the potable water supply system; a control system adjusting local water conditions within the potable water supply system; a bacteria monitor assessing water within the potable water system to determine at least levels of bacteria within the potable water system; and applying an antimicrobial condition to water within the potable water system.

16 Claims, 2 Drawing Sheets

FIG. 2

SENSE MICROBE STATUS IN WATER SOURCE

↓

LOCALLY TREAT WATER IN WATER SOURCE AS NEEDED

↓

MOVE WATER WITH KNOWN MICROB STATUS TO USE REGIONS WITHIN SYSTEM

↓

SENSE/MEASURE MICROBE STATUS AS WATER MOVES

↓

PROCESSOR DETERMINES NEEDED TREATMENT AT SPECIFIC POSITIONS IN WATER FLOW

↓

PROCESSOR DIRECTS LOCAL ANTIMICROBIAL ACTIVITY WITHIN THE SYSTEM

↓

WATER REINTRODUCED INTO ORIGINAL WATER SOURCE FOR SYSTEM

PROCESS TO SAFEGUARD AGAINST WATERBORNE BACTERIAL PATHOGENS

BACKGROUND OF THE INVENTION

1. Field of the Invention

The present invention relates to the field of treatment of water to remove antimicrobials in a system treatment facility and process. The invention also addresses treatment of highly treatment-resistant microbes, including *Legionella pneumophila*.

2. Background of the Art

The need for both regional, local and residential water storage has increased with growing potable water consumption and needs. As the infrastructure ages, storage and transportation systems of this water have become more prone to contamination and the entire water system is vulnerable to localized and systemic infection by microbes. OSHA standards presented below indicate that highly expensive materials, high energy utilization (e.g., extensive heating), regular monitoring, and labor-intensive methods are recommended for moderation and reasonable control over the Legionnaire microbe and other water borne pathogenic microorganisms.

Chemical additives are often used to control populations of microorganisms in potable and process water systems. Those chemicals tend to have limited ranges of effectiveness over the full spectrum of water-borne microbes and can, if improperly dosed, lead to more drug-resistant strains of the microbes, a serious problem in its own right. Some treatment regimens even suggest the disassembly of equipment to physically treat individual components because chemical treatment alone cannot insure proper microbe control.

Among the systems specifically identified in the OSHA Technical Manual are "Cooling Towers, Evaporative Condensers, and Fluid Coolers."

The function of cooling towers, evaporative condensers, and fluid coolers is to reject heat from system fluids through evaporation. Cooling towers are equipped with drift eliminators designed to limit droplet release. However, most cooling towers produce water in the cooling tower sump that is in the ideal temperature range for *Legionella* growth, 20°-50° C. (68°-122° F.). Further, drift eliminators cannot be 100% efficient at removing mists and droplets from escaping downwind and into the breathing zones of persons within a zone of impact.

1. Inspection and Maintenance. Visual inspection and periodic maintenance of the system are the best ways to control growth of *Legionella* and related organisms. Good maintenance is necessary both to control *Legionella* growth and for effective operation. The system should be properly monitored and maintained to prevent buildup of scale and sediment and bio-fouling, all of which support *Legionella* growth and reduce operating efficiency.
2. Biocide. Unfortunately, measurements of water quality such as total bacterial counts, total dissolved solids, and pH have not proven to be good indicators of *Legionella* levels in cooling towers. Periodic use of biocides is needed to ensure control of *Legionella* growth.
   - a. Little information exists on the demonstrated effectiveness of many commercial biocides for preventing *Legionella* growth in actual operations. Recent Australian studies indicate that Fentichlor [2,2'-thiobis (4-chlorophenol)] used weekly for 4 hours at 200 ppm, or bromo-chloro-dimethyl-hydantoin (BCD) in a slow-release cartridge at an initial concentration of 300 ppm are effective in controlling the growth of *Legionella*. Towerbrom 60M™, a chlorotriazine and sodium bromide salt mixture, has been reported to be effective when alternated with BCD for control of *Legionella* in U.S. studies of *Legionella* contamination of cooling towers. The Australian study also indicates that quaternary ammonium compounds, widely used for control of bio-fouling in cooling towers, are not effective in controlling *Legionella.*
   - b. Traditional oxidizing agents such as chlorine and bromine have been proven effective in controlling *Legionella* in cooling towers. Continuous chlorination at low free residual levels can be effective in controlling *Legionella* growth. It is important, however, that the proper oxidant level be established and maintained because free residual chlorine above 1 ppm may be corrosive to metals in the system and may damage wood used in cooling towers; free residual levels below 1 ppm may not adequately control *Legionella* growth. Chlorine also combines with organic substances in water to form toxic by-products that are of environmental concern. Frequent monitoring and control of pH is essential for maintaining adequate levels of free residual chlorine. Above a pH of 8.0, chlorine effectiveness is greatly reduced. Proper control of pH will maintain the effectiveness of chlorination and minimize corrosion. *Legionella* population excursions often occur in cooling towers due to inattention, failure to properly monitor either through neglect or other human error.
   - c. Bromine is an effective oxidizing biocide. It is frequently added as a bromide salt and generated by reaction with chlorine. Bromine's effectiveness is less dependent than chlorine on the pH of the water; it is less corrosive; and it also produces less toxic environmental by-products.
   - d. The effectiveness of any water-treatment regimen depends on the use of clean water. High concentrations of organic matter and dissolved solids in the water will reduce the effectiveness of any biocidal agent. Each sump should be equipped with a "bleed," and make-up water should be supplied to reduce the concentration of dissolved solids.
3. Design
   - a. One of the most effective means of controlling the growth of *Legionella* is to maintain sump water at a low temperature. Sump-water temperatures depend on tower design, heat load, flow rate, and ambient dry-bulb and wet-bulb temperatures. Under ideal conditions, sump-water temperatures in evaporative devices approach the ambient wet-bulb temperature, and that may be low enough to limit *Legionella* amplification. System design should recognize the value of operating with low sump-water temperatures.
   - b. High-efficiency drift eliminators are essential for all cooling towers. Older systems can usually be retrofitted with high-efficiency models. A well-designed and well-fitted drift eliminator can greatly reduce water loss and potential for exposure. Other important design features include easy access or easily disassembled components to allow cleaning of internal components including the packing (fill). Enclosure of the system will prevent unnecessary drift of water vapor, and other design features to minimize the spray generated by these systems are also desirable.
4. Frequency of Cleaning. Cooling towers should be cleaned and disinfected at least twice a year. Normally this maintenance will be performed before initial start-up at the beginning of the cooling season and after shut-down in the fall. Systems with heavy bio-fouling or high levels of *Legionella* may require additional cleaning. Any system that has been out of service for an extended period should be cleaned and disinfected. New systems require cleaning and disinfecting because construction material residue can contribute to *Legionella* growth.
5. Wisconsin Protocol. Acceptable cleaning procedures include those described in the Wisconsin Protocol. This procedure calls for an initial shock treatment with 50 ppm free residual (total) chlorine, addition of detergent to disperse bio-fouling, maintenance of 10 ppm chlorine for 24 hours, and a repeat of the cycle until there is no visual evidence of biofilms. To prevent exposure during cleaning and maintenance, wear proper personal protective equipment: a Tyvek-type suit with a hood, protective gloves, and a properly fitted respirator with a high-efficiency particulate (HEPA) filter or a filter effective at removing one-micron particles.
6. Recordkeeping. A description of the operating system (which includes all components cooled by the system) and details of the make-up water to the system should be available. Written procedures for proper operation and maintenance of the system should indicate the use of scale and corrosion inhibitors, antifoaming agents, and biocides or chlorine use and should be readily available. Log books should list dates of inspections and cleanings, water-quality test results, and maintenance.

C. Domestic Hot-Water Systems
1. Background. Domestic hot-water systems are frequently linked to Legionnaires' outbreaks. The term "domestic" applies to all non-process water used for lavatories, showers, drinking fountains, etc., in commercial, residential, and industrial settings. Disease transmission from domestic hot water may be by inhalation or aspiration of *Legionella*-contaminated aerosolized water. Water heaters that are maintained below 60° C. (140° F.) and contain scale and sediment tend to harbor the bacteria and provide essential nutrients for commensal micro-organisms that foster growth of *L. pneumophila*. Large water heaters like those used in hospitals or industrial settings frequently contain cool zones near the base where cold water enters and scale and sediment accumulate. The temperature and sediment in these zones can provide ideal conditions for amplification of the organism. Dead legs (i.e., sections of piping or plumbing that have been altered or capped such that water cannot flow through) and non-recirculated plumbing lines that allow hot water to stagnate also provide areas for growth of the organism.
2. Design. Water systems designed to recirculate water and minimize dead legs will reduce stagnation. If potential for scalding exists, appropriate, fail-safe scald-protection equipment should be employed. For example, pressure-independent, thermostatic mixing valves at delivery points can reduce delivery temperatures. Point-of-use water heaters can eliminate stagnation of hot water in infrequently used lines. Proper insulation of hot-water lines and heat tracing of specific lines can help maintain distribution and delivery temperatures.
3. Maintenance
   a. To minimize the growth of *Legionella* in the system, domestic hot water should be stored at a minimum of 60° C. (140° F.) and delivered at a minimum of 50° C. (122° F.) to all outlets. The hot-water tank should be drained periodically to remove scale and sediment and cleaned with chlorine solution if possible. The tank must be thoroughly rinsed to remove excess chlorine before reuse.
   b. Eliminate dead legs when possible, or install heat tracing to maintain 50° C. (122° F.) in the lines. Rubber or silicone gaskets provide nutrients for the bacteria, and removing them will help control growth of the organism. Frequent flushing of these lines should also reduce growth.
   c. Domestic hot-water recirculation pumps should run continuously. They should be excluded from energy conservation measures.
4. Control
   a. Raising the water-heater temperature can control or eliminate *Legionella* growth. Pasteurize the hot water system by raising the water-heater temperature to a minimum of 70° C. (158° F.) for 24 hours and then flushing each outlet for 20 minutes. It is important to flush all taps with the hot water because stagnant areas can "re-seed" the system. Exercise caution to avoid serious burns from the high water temperatures used in Pasteurization.
   b. Periodic chlorination of the system at the tank to produce 10 ppm free residual chlorine and flushing of all taps until a distinct odor of chlorine is evident is another means of control. In-line chlorinators can be installed in the hot water line; however, chlorine is quite corrosive and will shorten the service life of metal plumbing. Control of the pH is extremely important to ensure that there is adequate residual chlorine in the system.
   c. Alternative means to control *Legionella* growth include the use of metal ions such as copper or silver (which have a biocidal effect) in solution. Ozonization injects ozone into the water. Ultraviolet (UV) radiation also kills microorganisms. Commercial, in-line UV systems are effective and can be installed on incoming water lines or on recirculating systems, but stagnant zones may diminish the effectiveness of this treatment. Scale buildup on the UV lamp surface can rapidly reduce light intensity and requires frequent maintenance to ensure effective operation.

As can be seen, existing protocols and systems and materials are quite expensive. An improved process and system are needed.

SUMMARY OF THE INVENTION

A method includes performing an initial cleaning of the water storage and transportation system (WSTS), then installing a supervisory control and data acquisition smart water management system into the WSTS. The management system must have at least functional capabilities of measurement and control of local water conditions including pressure, temperature, pH (and even conductivity), and control systems for managing pressure, temperature and pH. Human machine interface software may be used and should be combined with a bacteria monitor.

The method may be generally described as a method for mitigating microbe buildup within a water storage system and/or water transportation system in potable water supply systems. The method may include:
  a) performing an initial cleaning of the water storage system and/or transportation system;
  b) implementing supervisory control and data acquisition on water stored and/or transported within the potable water supply systems the data acquisition including at least water conditions at multiple points within the potable water supply system;
  c) the control system adjusts local water conditions within the potable water supply system;
  d) a bacteria monitor assesses water within the potable water system to determine at least levels of bacteria within the potable water system; and
  e) apply an antimicrobial condition to water within the potable water system.

DETAILED DESCRIPTION OF THE INVENTION

An integrated system is used to implement a method for addressing microbe buildup within water storage and water transportation system in both large scale and small-scale water systems. The method includes performing an initial cleaning of the water storage and transportation system (WSTS), then installing a supervisory control and data acquisition smart water management system into the WSTS. The management system must have at least functional capabilities of measurement and control of local water conditions including pressure, temperature, pH (and even conductivity), and control systems for managing pressure, temperature and pH. Human machine interface software may be used and should be combined with a bacteria monitor.

The method may be described generally as a method for mitigating microbe buildup within a water storage system and/or water transportation system in potable water supply systems. As is understood in the commercial and residential treatment of water for certain microbes, especially *legionella*, mediation, mitigation and control of bacteria within standards acceptable to health standards is an acceptable goal. Complete elimination of all bacteria, and especially the more difficult and complex-to-treat microbes, is not a realistic goal. The method may include:
  a) performing an initial cleaning of the water storage system and/or transportation system. Cleaning and disinfection can be achieved using any or a combination of several techniques. The selection of an approach will depend on the age of the system, the potential for biofilm formation or mineral deposition on the internal surfaces of the pipes, the materials of construction of the piping system and the requirements of the guiding protocol being adopted. The most commonly used method includes the use of chlorine, typically in the form of sodium hypochlorite, to "shock" the system with residual chlorine at 50 ppm or greater concentrations. Hot water systems can be easily disinfected thermally by increasing the temperature of the water above the pasteurization temperature and maintaining that temperature for a prescribed period. It is possible to cross connect the hot and cold-water systems to allow thermal disinfection of both systems. For older water systems with significant mineral deposition on the internal pipe surfaces, it may be necessary to flush the system with defouling chemicals or mild acids to demineralize the system to improve the effectiveness of chemical or other disinfection technique. Whichever technique is selected must demonstrate the ability to penetrate and eliminate biofilm, particularly with regard to *Legionella* disinfection, due to *Legionella*'s ability to imbed in biofilms to escape contact with disinfection chemicals.
  b) implementing supervisory control—Many water systems become contaminated when the conditions in the water system become conducive for microbial growth. These conditions often occur due to human error, either through disregard, lack of information, forgetfulness or neglect. These root contributing causes can be mitigated through the installation of a properly designed Supervisory Control and Data Acquisition (SCADA) system. Sensors for water temperature, flow rate, pH, oxidation/reduction potential, pressure, dissolved oxygen, conductivity, level control, turbidity, valve positions, amperage for pumps, UV and other mission critical electrical sub-systems, and direct bacteria population counts. The sensors would be installed throughout both potable and non-potable water systems as well as subsystems that service and supply decorative fountains, cooling towers, evaporation ponds or other areas where water could become microbially active and/or where water could be aerosolized.

The sensors could be directly coupled with control mechanisms that would automatically initiate corrective action, or send information to a PLC, Remote Terminal Unit or central computer, which would then implement corrective action based on a programmed algorithm. Installation of sensors may be installed at or near the interface between the facility's water system and the public supply to insure water provided by the water authority met expected values for purity and disinfection. Sensors would also be installed at each cooling tower sump and make-up water to measure flow rates and insure sufficient make up water is introduced and biocides are added as prescribed by the algorithm or as dictated by the control requirements. Sensors would be installed at various appropriate locations distributed throughout the potable water system, such as in the mechanical room of each floor of a large building, to insure that the important water control parameters remain in the target range from the source to the distribution points.

Sensor measurements from the entirety of sensors would be transferred to the SCADA and recorded in a data historian. When or if any sensor measured and recorded a value outside the prescribed range, an alarm condition would be initiated and the system would provide a visible and/or audible signal that would display from a control station and/or at remote locations, such as the office computer screens of responsible personnel and at the Human Machine Interface (HMI) in the central control location. Depending on the alarm condition and the design of the system, a response may be implemented from the HMI, or by a pre-programmed algorithm or may require physical presence of a person at the alarm location. For example, a low temperature alarm in the hot water system may be rectified by the SCADA directing an increase in the temperature set-point. However, the same alarm may indicate a failed heating element, requiring human interaction. In either case, the SCADA would measure the system condition continuously and notify responsible persons to repair or mitigate the alarm condition, meaning that potential problems must be addressed in a timely and thorough manner.

c) the control system adjusts local water conditions within the potable water supply system. The critical parameters for a water system relative to conditions that favor microbial growth are pH, and temperature. Unfortunately, the pH of potable water should remain in a range that is favorable to microbial growth. However, non-potable water, such as the water that is used to dissipate heat in cooling towers, can be maintained at a pH level that inhibits bacterial growth. Control of the pH must be maintained in a narrow range, however, to avoid mineral deposition or excessive corrosion of cooling tower piping and components. The pH can be monitored and controlled remotely on a continuous basis or controlled from the PLC/computer as the situation and facility prefer. Temperature sensors will monitor water, ambient and room temperatures continuously and can automatically adjust thermostats as needed to maintain both cold and hot potable water supplies within the target ranges. It is also possible to program the system to alarm and notify responsible persons when a temperature reaches a predetermined trigger point. However, this diminishes the value of the SCADA and reduces the effectiveness and redundancy of the invention.

d) a bacteria monitor assesses water within the potable water system to determine at least levels of bacteria within the potable water system; and The current state-of-the-art equipment for "real-time" measurement of bacteria include the ability to distinguish between living and dead bacterial cells and to distinguish between bacteria and inert particulate matter in the bacterial size range. The current systems would monitor bacteria (live and dead) at multiple locations in the potable and non-potable water systems. The most likely locations include, the interface between the facility water systems and the public water supply, water storage tanks and vessels, cooling tower sumps and distributed locations throughout the system, such as on each floor in the mechanical room. One option is to place sampling taps just downstream of every check valve in the system.

It would be possible to monitor from several locations using a single instrument, with a properly designed remote sampling system. Once the number of sampling points increased to a certain point, multiple analytical instruments would be required. In any case, when a bacterial count is measured that exceeded a predetermined value, the SCADA system would initiate an alarm condition, providing audible and/or visual signals to responsible parties. The SCADA could be programed to close some or all the water supply valves or simply provide an alarm. The automated response could be staged to respond with different action depending the magnitude of the measured bacterial count. The SCADA could also be programed to initiate a response after a single measurement that exceeded the target value or to require two or more exceedances prior to alarm or independent action. In some situations, such as non-potable water sources, the SCADA could also initiate action to dose the system with biocides and continue to monitor bacteria populations until safe concentrations are reestablished.

The bacteria monitor should be able to achieve a detection limit to enable direct comparison to applicable standards and action levels for total bacterial count. For example, the Texas Department of State Health Services has provided guidelines for hospitals to detect and prevent the spread of nosocomial infection due to *Legionella*. The European Working Group for *Legionella* Infections(EWGLI) was established in 1986 within the European Union framework to share knowledge and experience about potential sources of *Legionella* and their control. This group has published guidelines about the actions to be taken to limit the number of colony-forming units (i.e., the "aerobic count") of microorganisms per mL at 30° C. (minimum 48 hours incubation):

| Aerobic Count | Legionella | Action Required |
|---|---|---|
| 10,000 or less | 1,000 or less | System Under Control |
| more than 10,000 up to 100,000 | more than 1,000 up to 10,000 | Review program operation. The count should be confirmedby immediate re-sampling. If a similar count is found again, areview of the control measures and risk assessment shouldbe carried out to identify any remedial actions. |
| more than 100,000 | more than 10,000 | Implement corrective action. The system should immediatelybe re-sampled. It should then be 'shot dosed' with an appropriate biocide, as a precaution. The risk assessment and control measures should be reviewed to identify remedial actions. | e) apply an antimicrobial condition to water within the potable water system. For non-potable water systems, the SCADA could provide preemptive control of biocide addition and insure antimicrobial conditions were maintained continuously. Biocide and/or non-GRAS chemical addition to potable sources is not allowed, so non-chemical means must be used to maintain conditions prohibitive to microbial activity. The most likely technology to use in the potable water system is Ultra-Violet irradiation of the water as it passes through the piping system. To insure the most effective bacterial kill, UV systems would be installed just downstream of the interface between the public water supply and the facility system, most likely just downstream of the check valves. The first UV system would treat all water entering the potable water system. Additional, smaller UV systems would be installed at distributed locations, such as on each floor of a facility. The second stage UV systems would insure maximum treatment of the water just prior to the point of use.

Other technologies capable of achieving a high kill rate for microbes would be suitable for this application, providing the technologies do not create water that does not meet potable water standards. The BioLargo AOS technology is one suitable option but would require removal of iodine to avoid taste issues. Another technology now under development is Low-Voltage Coaxial-electrode Electroporation Disinfection, wherein copper ions are electrochemically introduced at very low concentration into the water stream, creating antimicrobial conditions and achieving 6 log kill rates of subject bacteria. In any case, the biocidal treatment should be able to demonstrably reduce total bacteria and specifically *Legionella* and other infectious bacteria to below the applicable action levels, such as those listed in the table above.

There are a number of different types and models of continuous or batch bacteria monitors that can be used with the present technology. Adenosine triphosphate (ATP) testing, an indirect indicator method that monitors bacteria via bioluminescence. Ultrasnap™ or Aquasnap™ testing device, light is emitted in direct proportion to the number of bacteria present. GRUNDFOS BACMON™ is a fully automated bacteria monitoring solution. BACMON™ can monitor microbiological parameters in your water continuously, with automated batch sampling technology delivering results in minutes without adding chemicals. These online bacteria monitors can provide fully automated near real-time, on-site results, freedom from interactive calibration without the need for chemical analytical stains or dyes.

Metanor™ produces another example of an on-line, rapid response bacteria analyzer. Their system provides 24 hour per day coverage and can operate for extended periods without human intervention. The system uses hydrodynamic focusing of the bacterial laden sample combined with laser refractometry.

The present technology provides a process having a five-pronged approach to monitoring and control of *Legionella* and other water borne pathogenic bacteria. Technologies are emerging that make this approach possible, whereas just a few months ago, the approach was infeasible. The five steps include:

1. Produce an ANSI/ASHRAE 188 Compliant/Medicare S&C 17-30 Compliant Water Management Program—recent regulatory, governmental and institutional guidance has mandated that healthcare facilities have a compliant water management program in place.
2. Conduct a disinfection of all water supply lines and tanks in the potable water supply for the subject facility, using methods consistent with statutory requirements and the current state of the art techniques. It is possible that a system disinfection may have been conducted externally prior to or separate from this invention.
3. Design and install a (Supervisory Control and Data Acquisition) SCADA Smart Water Management system. The Smart Water Management System (SWMS) would incorporate temperature, pressure, conductivity, pH, and other parameters pertinent to controlling bacterial growth and which can be measured using remote sensors. The SWMS would collect, process and interface with responsible personnel through HMI stations strategically located in the facility. The SWMS would also remotely control pH, conductivity and biocide dosing for non-potable waters, such as cooling towers, fountains, and pools.
4. The SWMS would incorporate at least one real-time bacteria monitor. Such instruments have recently become commercially available and are generally based on light scattering from interaction with bacteria. The real-time bacteria monitor can be installed at the outlet of the facility potable water storage tank or installed to take periodic samples from multiple locations throughout the facility including, but not limited to, the storage tank inlet and outlet as well as sampling points on individual floors or areas served by the water system. Multiple instruments could be used, or multiple locations manifolded into a single instrument, or a combination of the two strategies as dictated by site specific requirements and/or programmatic goals.
5. The final feature of the invention will be the use of distributed secondary water disinfection treatment. Potable water is supplied from the municipality or water company that is safe to consume, but not necessarily completely free of bacteria. Bacteria can reproduce when water temperatures are in the favorable range and when an energy source becomes available. There is generally no further treatment of the water once it reaches a facility. In this invention, secondary water treatment would be installed at the outlet of the main potable water tank, (or directly in-line for systems with no storage tank installed) with additional treatment units installed on each floor, or other geometrically separate locations near the point of release for consumption. The most likely technology for this purpose will be appropriately sized ultra-violet light units. However, other treatment technologies could be used including the BioLargo AOS technology. The secondary treatment step is not limited to a particular technology but should be able to achieve suitable bacterial kill rates. UV is anticipated to achieve a Log 4 (99.99%) kill rate. Targeted kill rates will be program and site specific but are expected to be in the Log 4 range.

Problems the Invention Addresses:

Incidents of Legionnaires disease are being reported with increasing frequency. According to the CDC, "a total of 2,809 confirmed Legionnaires' disease cases were reported across the United States in 2015, including 85 (3%) definite and 468 (17%) possible healthcare-associated cases. It is thought that 3% is just the tip of the iceberg; the number is probably much higher, and closer to one in five." Also, "according to the CDC, about 5,000 people are diagnosed as having Legionnaires' disease annually, and the number has increased in recent years. There are at least 20 outbreaks reported each year. Legionnaires' disease is a widespread problem across the country, and in 1 year it costs insurers $144 million in hospital claims, with a total cost per patient of approximately $38,000." Source: http://www-.cidrap.umn.edu/news-perspective/2017/06/cdc-most-healthcare-acquired-legionnaires-cases-could-be-prevented.

Interaction of Steps to Create the Invention Environment:

Each of the individual steps of the invention have some value in either monitoring or controlling the population of *Legionella* and other pathogenic bacteria in water systems. However, no programmatic approach has existed that combines each of the described steps into an integrated approach that would monitor the multiple parameters than impact bacterial populations, control those parameters to minimize bacterial populations, monitor bacterial populations directly and provide on-site effective secondary water treatment to essentially eliminate water borne disease in health care settings. Implementing all the steps of the Invention will insure that *Legionella* and other water borne pathogenic bacteria are destroyed and healthcare facility acquired infections from contaminated water, and their associated cost in money, resources and human suffering are all but eliminated.

Implementation of any portion of the invention would be helpful, but would leave a gap in coverage, making *Legionella* infections possible. Only through complete and thorough implementation can the probability of infection be reduced to inconsequential levels.

Some potable water systems are independent of direct state, county or municipal involvement. For example, a potable water system in a cruise ship includes at least a water storage tank, pressure controls, water outlets in kitchens, lavatories, drinking fountains and swimming pools (even though the last is not strictly potable, but can be incidentally imbibed). As an initial step in the periodic system treatments, at regular intervals (such as between each cruise), a high-intensity overkill is used, as with high halogen content, high hydrogen peroxide, high chlorine (or other chemistry to which bacteria cannot develop chemical resistance) concentrations are used, following or in advance of the chemical treatment. In defined areas, initial high intensity exposure to ultraviolet radiation (or other radiation such as alpha particles or other antimicrobial radiation) is provided with small mechanical/electrical components that can be transported in water flow through the system. After this initial treatment, sensors located in the tank, at an entry pipe to the kitchen, at the main access to residential (cabin) water supply, and in the water circulation for the pool are monitored for presence of specific bacteria or virus, in this case *legionella* is sensed for concentration of the organism (and samples taken to test for specific strains). Where excessive concentrations are identified at a specific position, additional high concentration or high energy specific area treatment is provided.

After this initial and follow-up treatment, a filtration system having iodine-activated carbon filter layers having an electric current passed through the filters. This system is disclosed in U.S. Pat. Nos. 8,679,515 and 10,051,866 (Code) (Code) and Published US Patent Documents 2017/0362104 ELECTROCHEMICAL DECONTAMINATION CELLS; 2017/0065905 ANTIMICROBIAL SOLUTIONS AND METHODS; and 2017/0029298 ELECTROCHEMICAL DECONTAMINATION CELLS. These systems are run at least during high volume periods of water use, with individual units positioned along internal flow paths for the respective positions. All citations and patent materials cited herein are incorporated by reference in their entireties.

The current invention would be applied in the same order as with land-based systems. However, additional or different documentation may be required by a governing or oversight agency. Marine potable water systems may be regulated under the jurisdiction of any or several organizations including the World Health Organization, United States Coast Guard, World Maritime Organization, United States Environmental Protection Agency, and the Maritime Labour Convention. Therefore, step one of the invention process will be to prepare the necessary plans and documentation to meet the applicable regulations, guidance and standards. For example, the MLC 2006 requires formulating a Fresh Water Safety Plan (FWSP), which would take the place of, or supplement the ANSI/ASHRAE 188 compliant plan.

Step 2 of the process should be routinely performed for shipboard water systems. Performance of the sanitation step would be confirmed and documented prior to implementing the rest of the invention process.

Step 3, the installation of a SCADA system on-board ship could impose unique challenges related to the design and configuration of a system that would be compatible with existing ship monitoring and control systems. The water system SCADA should operate in conjunction with and in some cases, in parallel to existing electronic systems. For shipboard service, the SCADA system would include special features to monitor swimming pools, spas, deck showers and water fountains in addition to potable water sources. The monitoring system may include specialized and dedicated analytical instruments to measure residual chlorine concentrations in the public water sources or monitor specific anion concentrations for unique chemical biocides on a case by case basis. The SWMS could function completely independently from the existing electronic systems or act as an subordinate system, supplying data and serving as a backup data historian.

Under Step 4, the SWMS would incorporate at least one real-time bacteria monitor. It would be recommended for certain shipboard applications, such as cruise ships, that separate bacteria monitors be used for potable and non-potable water systems to avoid cross contamination and ease calibration range issues related to two different water quality standards.

In Step 5 of the invention, distributed secondary potable water treatment units could be installed at each deck of the ship, with separate treatment units installed for each galley and food service area. As is the case with land-based systems, any of several technologies could be used to conduct the treatment. However, UV systems are the most cost effective and offer ease of installation and use.

A more typical example of implementing the invention will be for use in a health care setting such as a medium to large scale hospital. Modern hospitals often have multiple buildings, each with specific purposes and each with specific water quality requirements. Additionally, within each structure, different areas focused on different missions may require different water quality levels. This invention would not interfere with tertiary water treatment units that provide water to areas requiring special grades of water (i.e. laboratories, operating rooms, clean rooms, infectious disease and isolation wards). The five-step invention would be implemented as previously described, beginning with an ANSI/ASHRAE 188 Compliant/Medicare S&C 17-30 Compliant Water Management Program Document. The document would address all water systems, both potable and non-potable, with sections providing specific instructions and prescribing procedures to execute disinfection of all water systems including high-grade requirements in dedicated areas of the hospital campus.

Another example of a facility type that could benefit from the invention is hotel, motel, lodge or inn. The first recognized outbreak of Legionnaire's disease was documented at the Bellevue-Stratford Hotel in Philadelphia, Pa. in the summer of 1976. *Legionella* bacteria was found in high concentrations in the cooling tower water of the hotel's air conditioning system, which then spread through the building. Retrospective diagnostic studies have identified likely outbreaks that occurred as early as 1959 in Pontiac, Mich. and at St. Elizabeth's Hospital in Washington, D.C. in 1965. The five-step invention could be implemented in the normal fashion with such additions as necessary to comply with local, state and Federal requirements for documentation and initial disinfection of existing water plumbing systems.

Another example is to install the invention in amusement parks and theme parks. In 2017, 22 cases of Legionnarie's disease were identified at Disneyland theme park in Anaheim, Calif. The source of the bacteria was traced to cooling towers that had not been effectively disinfected and dosed with biocide. Implementing the five-step invention would have identified the lack of biocide and the presence of high concentrations of bacteria in the cooling tower water long before the situation became infectious. The five-step invention would be implemented across the entire park, on both potable and non-potable water systems. Depending on the size and scale of the facility, multiple independently operating SWMS subsystems may be required. The multiple SWMS systems can operate as fully independent units or provide communication to and from a central control unit.

The central unit may act solely as a data acquisition unit or provide command and control of the sub-systems across the entire site.

Figure 1:
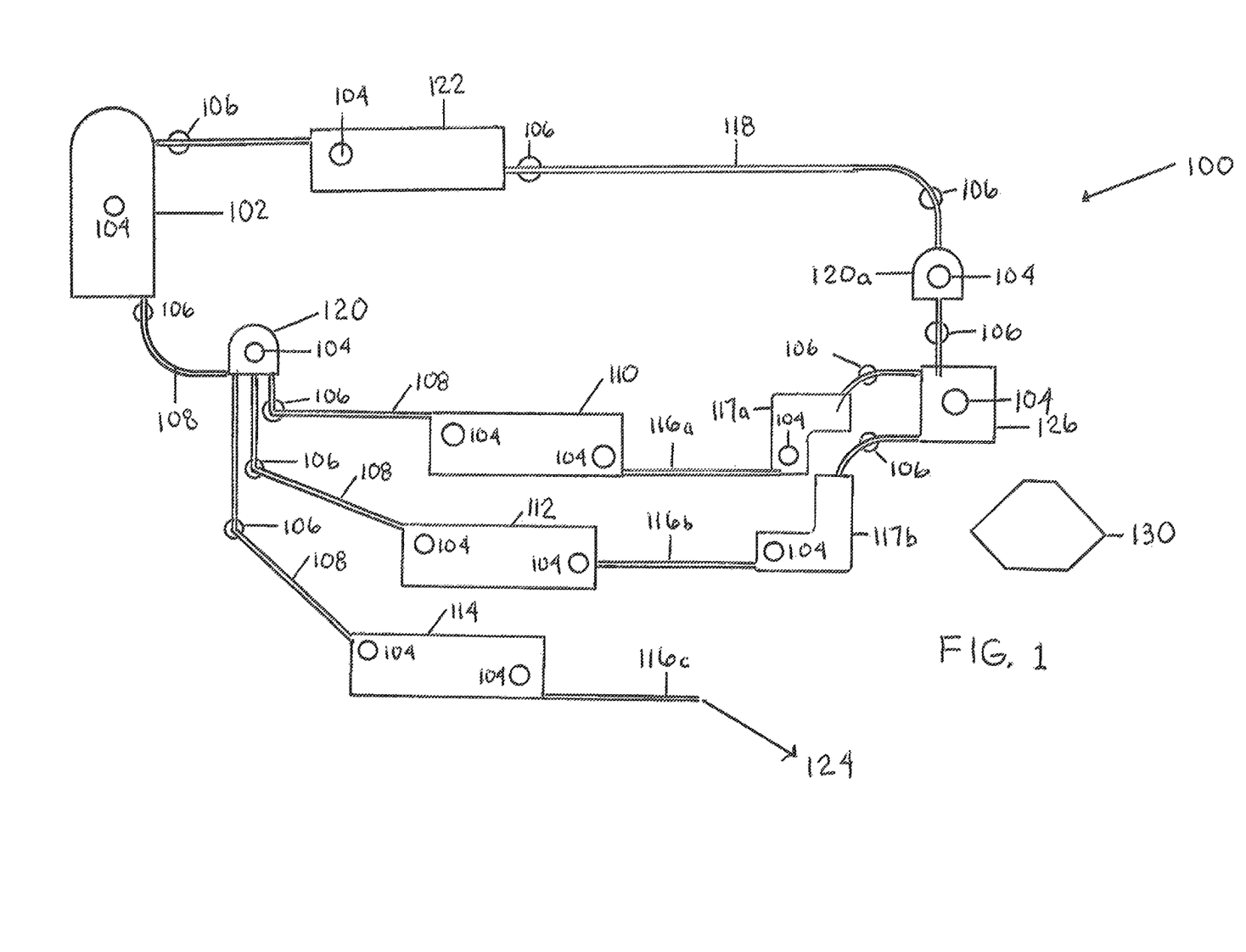
FIG. 1 shows a schematic of equipment that may be used to enable practice of the invention.

Another example of a facility type that would benefit from the invention is long-term care facilities, (i.e. nursing homes, veterans' homes or rehabilitation facilities). These facilities would implement the entire five-step program as originally envisioned, including the ASHRAE/Medicare compliant water management program. Such facilities house and provide care for a demographic that is, due to age, disease compromised immune systems or immune systems subdued through drug therapy, highly susceptible to *Legionella* infections and are less capable of fighting the infection after it manifests. In 2005, 127 cases of *Legionella pneumophila* were diagnosed at the Seven Oaks Home for the Aged in Toronto, Canada. Of the 127 cases, there were 21 fatalities. In 2015 a veterans home in Quincy, Ill. recorded a *Legionella* outbreak affecting 58 residents with 13 fatalities. Such facilities could implement the invention as described with distributed water disinfection at every floor or section of the facility.

*Legionella* outbreaks are not restricted to health care facilities and hotels. Multiple documented outbreaks have occurred in factories and public buildings. Sources of the infectious bacteria was most often a cooling tower that was part of an air conditioning system. However, evaporative coolers, also known as swamp coolers, can be an effective means of producing water droplets and introducing them into the breathing zones of people. If the water in the evaporative cooler is contaminated or allowed to develop into a bacteria friendly environment, the device will introduce infectious concentrations of *Legionella* into the breathing air. Neither factories nor public buildings would require the first step of the invention, that is providing a written plan or program design for water safety. However, such a plan or document would be helpful in mitigating impacts and executing the other four steps of the invention. The remaining four steps would be implemented as described.

Another example of a type of source that would benefit from the invention is public fountains, hot tubs and spas. There have been several documented cases of *Legionella* outbreaks due to bacteria laden waters in fountains. Eleven cases were documented in an outbreak in Vizela, Portugal from a decorative fountain in 2000. A hot tub was the source of an outbreak in the Netherlands in 1999 that caused 318 cases of *Legionella* with 32 fatalities. A decorative fountain in the lobby of the JW Marriott in Chicago, Ill. caused 10 documented cases in 2012. Implementation of the invention for these types of systems would require less complex SCADA systems and reduced numbers of distributed disinfection units, but the invention would be applied in the same sequence and with all the prescribed physical equipment in use.

Another example, related in size and general arrangement as large health care facilities but with less complexity, is residential apartment buildings or condominiums where the water is supplied through a building wide distribution network that originates from a common public water utility. The invention would be implemented in the same fashion, except the required water safety program would be modified to meet local or site specific requirements for documentation, which may or not be consistent with the aforementioned ASHRAE standards. In the case of a large apartment building the SCADA system would notify the building superintendent or building owner. It would possible to tie the SCADA information into a system provided to the chairperson of the owner's or renter's association to insure the building management has appropriate oversight by interested stakeholders.

The method of the present technology may be further described as a method for mitigating microbe buildup within a water storage system and/or water transportation system in potable water supply systems, the method including:

a) performing an initial cleaning of the water storage system and/or transportation system,
b) implement supervisory control and data acquisition on water stored and/or transported within the potable water supply systems the data acquisition including at least water conditions at multiple points within the potable water supply system,
c) the control system adjusts local water conditions within the potable water supply system;
d) a bacteria monitor assesses water within the potable water system to determine at least levels of bacteria within the potable water system; and
e) apply an antimicrobial condition to water within the potable water system.

The applying an antimicrobial condition may be selected from the group consisting of ultraviolet radiation exposure, infrared radiation exposure, electrical current exposure and iodine-activated porous carbon with electrical current applied thereto.

Reference to the Figures will further assist in an appreciation of the present inventive technology.

FIG. 1 shows a schematic of equipment 100 that may be used to enable practice of the invention in a partially closed system. The equipment 100 is shown with a primary originating water source 102 in communication through outflow tubing or pipes 108 to various uses and treatments. At least one main pump 120 will support pressure throughout the equipment 100 through the outflow pipes 108. In this equipment, three different specific uses are disclosed, direct human consumption and overflow water (sinks, drinking fountains, showers, temperature control misting, etc.) 110, functional water usage (surface cleaning devices, dishwashers, clothes washers, power sprays, etc.) 112 and major waste treatment operations (toilets, urinals, medical waste collection/disposal, etc.) 114. The last specific use will likely be discarded completely through vent tube 116*c* into a waste collection area 124. It may be treated and recycled in the equipment 100, but this is likely to be too costly and stressful on any fully closed system, as well as being cost ineffective. Used water flow from the first two systems 110 and 112 are carried through respective vent tubes 116*a* and 116*b* into their own distinct and compatible initial water treatment components 117*a* and 117*b* designed to treat the specific content of the effluents from the respective systems. Effluent from these two respective water treatment components 117*a* and 117*b* then go into a more generic and universal water treatment area 126 which may include chemical, thermal and irradiation treatment components (not shown). Effluent from this universal water treatment area 126 is then forced by a pump 120*a* into return pipes 118. These return pipes 118 carry the water that has been treated multiple time into a final treatment area 122, where final treatment identified as needed can be performed from among the various treatments identified above, This finally treated water is then reintroduced to the original water source 102. The final treatment may also be the addition of specific chemical treatment components that will be flushed through the entire equipment 100 for a massive system treatment.

At various internal positions 104 to individual components and systems identified above and internal to tubes, pipes and carrying media (e.g., 108 and 118) 106 are sensors for detecting microbial content or activity to enable design of local and generic treatments for the equipment. These sensors can transmit (by hardwire or preferably WiFi or non-wired transmission) the sensed data to a central processor 130. This central processor can determine from the received data the individual area, point or regional needs for treatment of the water moving through the equipment and direct by retransmission to the individual equipment in the regions, points and areas exactly what changes must be made in the treatments. The signals could direct changes in temperature, irradiation levels, chemical input flow, pH changes, flow rates and even a shutdown for emergency high level systemic treatment.

Figure 2:
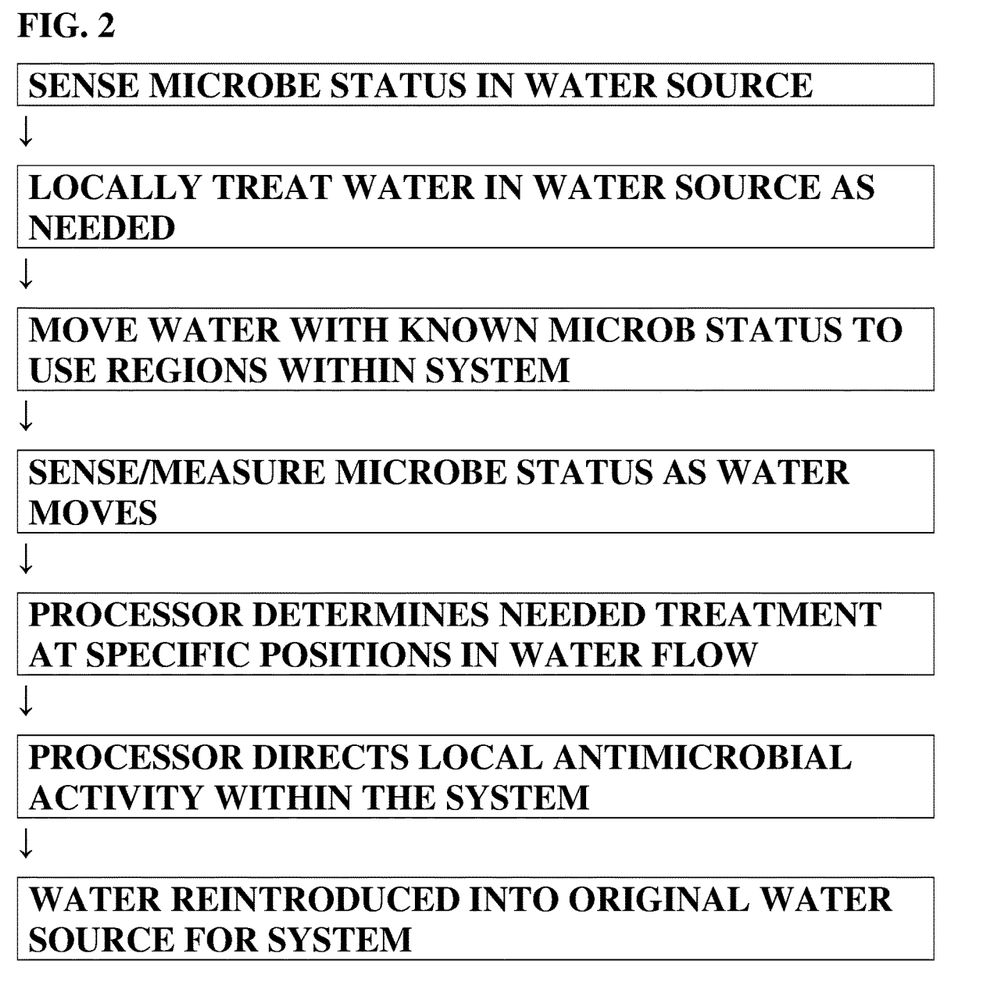
FIG. 2 provides a flow sheet displaying progression of a process according to the present invention.

FIG. 2 provides a flow sheet displaying progression of a process according to the present invention.

The initial cleaning may include a cycle of an initial antimicrobial chemical shock treatment, subsequent addition of a detergent, maintenance of at least 5 ppm of the antimicrobial chemical, and repeating the cycle until there is no visual evidence of a biofilm in the water storage system and/or transportation system, or the initial cleaning may include a cycle of an initial shock treatment with >40 ppm free residual chlorine, addition of detergent to disperse bio-fouling, maintenance of at least 10 ppm chlorine for 24 hours, and at least one repeat of the cycle until there is no visual evidence of biofilms in the water storage system and/or transportation system. The control system may adjust local water conditions within the potable water supply system to conditions of pH and temperature that do not favor microbial growth.

In the method, after the bacteria monitor assesses water within the potable water system to determine at least levels of bacteria within the potable water system, an antimicrobial condition is applied to water within the potable water system to reduce the at least level of bacteria within the potable water system to a level generally safe for human consumption.

The method of applying of antimicrobial conditions to water within the potable water system (which is described in pending U.S. patent application Ser. No. 15/233,693, filed 10 Aug. 2017 titled ODOR-REDUCTION SYSTEM AND MATERIALS, which is incorporated by reference in its entirety) comprises method of generating reductive and/or oxidative chemical species in an aqueous fluid stream of the water within the potable water system to disinfect and remove contamination comprising:
 f) providing a filter material comprising at least one a porous carbon support layer and a silicate/glass wool layer;
 g) passing an electric current through the filter material;
 h) passing a fluid stream containing elemental halogens and/or halide salts through the filter material, distributing halogens or halides within the filter material;
 i) directing a contaminated fluid mass into contact with the filter material in the presence of the electric current; and
 j) adsorbing contaminants from the fluid mass onto the filter material disinfecting or removing the contaminants.

What is claimed:

1. A method for mitigating microbe buildup within a water storage system and/or water transportation system in potable water supply systems, the method including:
 a) performing an initial cleaning of the water storage system and/or transportation system,
 b) implement supervisory control and data acquisition on water stored and/or transported within the potable water supply systems the data acquisition including at least water conditions at multiple points within the potable water supply system,
 c) the control system adjusts local water conditions within the potable water supply system;
 d) a bacteria monitor assesses water within the potable water system to determine at least levels of bacteria within the potable water system; and
 e) apply an antimicrobial condition to water within the potable water system;
wherein the initial cleaning comprises a cycle of an initial antimicrobial chemical shock treatment, subsequent addition of a detergent, maintenance of at least 5 ppm of the antimicrobial chemical, and repeating the cycle until there is no visual evidence of a biofilm in the water storage system and/or transportation system.

2. The method of claim 1 wherein applying an antimicrobial condition is selected from the group consisting of ultraviolet radiation exposure, infrared radiation exposure, electrical current exposure and iodine-activated porous carbon with electrical current applied thereto.

3. The method of claim 1 wherein the initial cleaning comprises a cycle of an initial shock treatment with >40 ppm free residual chlorine, addition of detergent to disperse bio-fouling, maintenance of at least 10 ppm chlorine for 24 hours, and at least one repeat of the cycle until there is no visual evidence of biofilms in the water storage system and/or transportation system.

4. The method of claim 1 wherein the control system adjusts local water conditions within the potable water supply system to conditions of pH and temperature that do not favor microbial growth.

5. The method of claim 1 wherein the control system adjusts local water conditions within the potable water supply system to conditions of pH and temperature that do not favor microbial growth.

6. The method of claim 3 wherein the control system adjusts local water conditions within the potable water supply system to conditions of pH and temperature that do not favor microbial growth.

7. The method of claim 5 wherein after the bacteria monitor assesses water within the potable water system to determine at least levels of bacteria within the potable water system, an antimicrobial condition is applied to water within the potable water system to reduce the at least level of bacteria within the potable water system to a level generally safe for human consumption.

8. The method of claim 3 wherein after the bacteria monitor assesses water within the potable water system to determine at least levels of bacteria within the potable water system, an antimicrobial condition is applied to water within the potable water system to reduce the at least level of bacteria within the potable water system to a level generally safe for human consumption.

9. The method of claim 4 wherein after the bacteria monitor assesses water within the potable water system to determine at least levels of bacteria within the potable water system, an antimicrobial condition is applied to water within the potable water system to reduce the at least level of bacteria within the potable water system to a level generally safe for human consumption.

10. The method of claim 6 wherein after the bacteria monitor assesses water within the potable water system to determine at least levels of bacteria within the potable water system, an antimicrobial condition is applied to water within the potable water system to reduce the at least level of bacteria within the potable water system to a level generally safe for human consumption.

11. The method of claim 1 wherein the applying of antimicrobial conditions to water within the potable water system comprises method of generating reductive and/or oxidative chemical species in an aqueous fluid stream of the water within the potable water system to disinfect and remove contamination comprising:
   i. providing a filter material comprising at least one a porous carbon support layer and a silicate/glass wool layer;
   ii. passing an electric current through the filter material;
   iii. passing a fluid stream containing elemental halogens and/or halide salts through the filter material, distributing halogens or halides within the filter material;
   iv. directing a contaminated fluid mass into contact with the filter material in the presence of the electric current; and
   v. adsorbing contaminants from the fluid mass onto the filter material disinfecting or removing the contaminants.

12. The method of claim 3 wherein the applying of antimicrobial conditions to water within the potable water system comprises method of generating reductive and/or oxidative chemical species in an aqueous fluid stream of the water within the potable water system to disinfect and remove contamination comprising:
   a) providing a filter material comprising at least one a porous carbon support layer and a silicate/glass wool layer;
   b) passing an electric current through the filter material;
   c) passing a fluid stream containing elemental halogens and/or halide salts through the filter material, distributing halogens or halides within the filter material;
   d) directing a contaminated fluid mass into contact with the filter material in the presence of the electric current; and
   e) adsorbing contaminants from the fluid mass onto the filter material disinfecting or removing the contaminants.

13. The method of claim 6 wherein the applying of antimicrobial conditions to water within the potable water system comprises method of generating reductive and/or oxidative chemical species in an aqueous fluid stream of the water within the potable water system to disinfect and remove contamination comprising:
   a) providing a filter material comprising at least one a porous carbon support layer and a silicate/glass wool layer;
   b) passing an electric current through the filter material;
   c) passing a fluid stream containing elemental halogens and/or halide salts through the filter material, distributing halogens or halides within the filter material;
   d) directing a contaminated fluid mass into contact with the filter material in the presence of the electric current; and
adsorbing contaminants from the fluid mass onto the filter material disinfecting or removing the contaminants.

14. The method of claim 8 wherein the applying of antimicrobial conditions to water within the potable water system comprises method of generating reductive and/or oxidative chemical species in an aqueous fluid stream of the water within the potable water system to disinfect and remove contamination comprising:
   f) providing a filter material comprising at least one a porous carbon support layer and a silicate/glass wool layer;
   g) passing an electric current through the filter material;
   h) passing a fluid stream containing elemental halogens and/or halide salts through the filter material, distributing halogens or halides within the filter material;
   i) directing a contaminated fluid mass into contact with the filter material in the presence of the electric current; and
   j) adsorbing contaminants from the fluid mass onto the filter material disinfecting or removing the contaminants.

15. The method of claim 9 wherein the applying of antimicrobial conditions to water within the potable water system comprises method of generating reductive and/or oxidative chemical species in an aqueous fluid stream of the water within the potable water system to disinfect and remove contamination comprising:
   f) providing a filter material comprising at least one a porous carbon support layer and a silicate/glass wool layer;
   g) passing an electric current through the filter material;
   h) passing a fluid stream containing elemental halogens and/or halide salts through the filter material, distributing halogens or halides within the filter material;
   i) directing a contaminated fluid mass into contact with the filter material in the presence of the electric current; and
   i) adsorbing contaminants from the fluid mass onto the filter material disinfecting or removing the contaminants.

16. The method of claim 10 wherein the applying of antimicrobial conditions to water within the potable water system comprises method of generating reductive and/or oxidative chemical species in an aqueous fluid stream of the water within the potable water system to disinfect and remove contamination comprising:
   f) providing a filter material comprising at least one a porous carbon support layer and a silicate/glass wool layer;
   g) passing an electric current through the filter material;
   h) passing a fluid stream containing elemental halogens and/or halide salts through the filter material, distributing halogens or halides within the filter material;
   i) directing a contaminated fluid mass into contact with the filter material in the presence of the electric current; and
   j) adsorbing contaminants from the fluid mass onto the filter material disinfecting or removing the contaminants.

* * * * *